United States Patent Office 3,305,581
Patented Feb. 21, 1967

3,305,581
β,β′-DIHALODIETHYLAMMONIUM
THIOSULFONATES
Joan H. Rogers, Midland, Mich., assignor to The Dow Chemical Company, Midland, Mich., a corporation of Delaware
No Drawing. Filed Oct. 28, 1963, Ser. No. 319,529
4 Claims. (Cl. 260—501)

The present invention is directed to β,β′-dihalodiethyl ammonium thiosulfonates corresponding to the formula

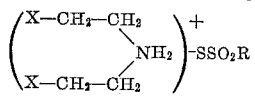

In this and succeeding formulae, R represents a member of the group consisting of lower alkyl, phenyl, lower alkyl-phenyl, halo-phenyl and lower alkyl-halo-phenyl and X designates a halogen. In the present specification and claims, the expression "lower alkyl" is employed to designate an alkyl group containing up to and including 6 carbon atoms, and "halo" and "halogen" to refer to chlorine, bromine and iodine. These compounds are crystalline solid materials at room temperature, which are somewhat soluble in many common organic solvents and water. The compounds are useful as pesticides and are adapted to be employed for the control of a number of insects, bacterial and fungal organisms such as roaches, potato and tomato late blight. *Aerobacter aerogenes*, *Pseudomonas aeruginosa*, *Salmonella typhosa*, and *Staphlococcus aureus*.

The novel β,β′-dihalodiethylammonium thiosulfonates of the present invention are prepared by reacting β,β′-dichlorodiethylamine hydrohalide corresponding to the formula:

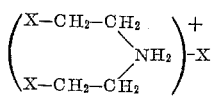

wherein X represents halogen, with an alkali metal salt of a thiosulfonic acid corresponding to the formula:

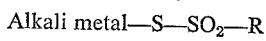

The reaction conveniently is carried out in an organic liquid as reaction medium such as ethanol, methanol, propanol, acetone, and isopropanol. The amounts of the reagents to be employed and reaction conditions are not critical, some of the desired product being obtained at once when employing any proportion of the reactants. In a preferred method of operation, good results are obtained when employing one molecular proportion of the β,β′-dihalodiethylamine hydrohalide with about one molecular proportion of the alkali metal salt of the thiosulfonic acid, such as the sodium or potassum salt. Representative materials to be employed are sodium butanethiosulfonate, potassium ethanethiosulfonate, sodium 2-methyl-5-bromo-benzenethiosulfonate, sodium 3,5-diethyl-4-iodobenzenethiosulfonate, potassium 2-iodobenzenethiosulfonate, sodium 4-tert.-butylbenzenethiosulfonate, potassium 3,4,5-trichlorobenzenethiosulfonate, potassium 3,4,5 - triethylbenzenethiosulfonate, sodium 2,6-diethyl-4 - iodobenzenethiosulfonate, sodium 3-ethyl-5-iodobenzenethiosulfonate, sodium 2-butyl-4-chlorobenzenethiosulfonate, and potassium pentachlorobenzenethiosulfonate. The reaction takes place smoothly at temperatures at which halide of reaction is produced and conveniently at temperatures of from 0° to 60° C. The halide appears in the reaction mixture as an alkali metal halide.

In carrying out the reaction, the reactants are mixed and contacted together in any convenient fashion and the resulting mixture maintained for a period of time in the reaction temperature range to insure completion of the reaction. Following the reaction, the reaction mixture is processed by conventional procedures to obtain the desired product. In a convenient procedure, the halide of reaction is removed by filtration from the reaction mixture and the organic reaction medium removed thereafter by evaporation to leave the product as a residue. This product can be employed in pesticidal applications, or further purified by conventional procedures such as recrystallization from common organic solvents.

The following examples merely illustrate the invention and are not to be construed as limiting.

*Example 1.*—β,β′-dichlorodiethylammonium p-*toluenethiosulfonate*

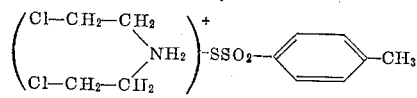

β,β′ - dichlorodiethylamine hydrochloride (8.9 grams; 0.050 mole) and potassium p-toluenethiosulfonate (11.3 grams; 0.050 mole) were dispersed in 150 milliliters of acetone. The resulting mixture was stirred at room temperature for ten minutes, after which the reaction mixture was then filtered to remove the potassium chloride. The filtrate was evaporated to dryness and the β,β′-dichlorodiethyl ammonium p-toluenethiosulfonate product residue was collected and washed with ether to yield the product as a crystalline solid. Recrystallization of this product from isopropanol yielded colorless crystals which melted at 99°–101° C. and had carbon, hydrogen and nitrogen contents of 40.20, 5.27 and 4.22 percent respectively, as compared to the theoretical contents of 40.00, 5.19 and 4.24 percent.

The following novel compounds of the present invention are prepared in a similar manner.

β,β′-dibromodiethylammonium 2,4,6-trichlorobenzenethiosulfonate (molecular weight of 340) by reacting together β,β′-dibromodiethylamine hydrobromide and sodium 2,4,6-trichlorobenzenethiosulfonate.

β,β′-diiododiethylammonium hexanethiosulfonate (molecular weight of 493) by reacting together β,β′-diiododiethylamine hydroiodide and potassium hexanethiosulfonate.

β,β′-dibromodiethylammonium 3,6-dichloro-4 - propylbenzenethiosulfonate (molecular weight of 552) by reacting together β,β′-dibromodiethylamine hydrobromide and sodium 3,6-dichloro-4-propylbenzenethiosulfonate.

β,β′ - dichlorodiethylammonium pentamethylbenzenethiosulfonate (molecular weight of 372) by reacting together β,β′-dichlorodiethylamine hydrochloride and potassium pentamethylbenzenethiosulfonate.

β,β′ - diiododiethylammonium 3,4,5 - tribromobenzenethiosulfonate (molecular weight of 721) by reacting together β,β′-diiododiethylamine hydroiodide and sodium 3,4,5-tribromobenzenethiosulfonate.

β,β′-dichlorodiethylammonium 2,6-dichloro - 5 - pentylbenzenethiosulfonate (molecular weight of 441) by reacting together β,β′-dichlorodiethylamine hydrochloride and sodium 2,6-dichloro-5-pentylbenzenethiosulfonate.

β,β′-dichlorodiethylammonium 3,5-diethylbenzenethiosulfonate (molecular weight of 300) by reacting together β,β′-dichlorodiethylamine hydrochloride and sodium 3,5-diethylbenzenethiosulfonate.

β,β′ - dichlorodiethylammonium methanethiosulfonate (melting at 82°–84° C. and having a carbon, hydrogen and nitrogen content of 23.88, 5.26 and 5.35 percent, respectively, as compared to the theoretical content of 23.62, 5.15 and 5.52 percent) by reacting together β,β′-dichlorodiethylamine hydrochloride and potassium methanethiosulfonate.

β,β′ - dichlorodiethylammonium benzenethiosulfonate (melting at 80°–82.5° C. and having carbon, hydrogen and nitrogen contents of 37.76, 4.76 and 4.30 percent, respectively, as compared to the theoretical contents of 37.97, 4.78 and 4.43 percent) by reacting together β,β'-dichlorodiethylamine hydrochloride and potassium benzenethiosulfonate.

The compounds of the present invention or the compositions containing the same can be applied to pests and their habitats and foods in parasiticidal amounts to obtain excellent controls and kills of many organisms. The compounds can conveniently be employed in liquid or dust formulations. In such usage, the compounds are modified with one or a plurality of adjuvants or helpers including water, organic solvents, petroleum oils, petroleum distillates, or other liquid carriers, surface active dispersing agents and finely divided solids such as chalk, talc or bentonite, or they can be employed as concentrates and subsequently diluted with additional liquid or solid adjuvants to produce the ultimate treating compositions. In representative operations β,β'-dichlorodiethylammonium methanethiosulfonate at concentrations of 500 parts per million by weight gave excellent controls and kills of *Aerobacter aerogenes, Pseudomonas aeruginosa, Salmonella typhosa*, and *Staphylococcus aureus*.

The thiosulfonates employed as starting materials in accordance with the teachings of the present invention can be prepared in accordance with known methods. In one method, potassium hydrosulfide (KSH) is reacted with a suitable lower alkane, benzene, halobenzene, lower alkylbenzene or lower alkyl-halobenzene sulfonyl halide including the sulfonyl chlorides and sufonyl bromides. Representative halides include, tert.-butanesulfonyl chloride, 2,4,6-tribromobenzenesulfonyl bromide, 3,4,5-trichlorobenzenesulfonyl chloride, 4-hexylbenzenesulfonyl chloride, 2,6-dibromo-4-propylbenzenesulfonyl chloride, propanesulfonyl chloride, 3,4,5-trimethylbenzenesulfonyl chloride, 3-iodobenzenesulfonyl chloride, and 2,5-diethylbenzenesulfonyl bromide. In a convenient procedure, the reaction is carried out by adding the sulfonyl halide to an aqueous or alcoholic solution of potassium hydroxide saturated with H₂S. Upon completion of the reaction, the desired starting materials are separated by conventional procedures.

The β,β'-dihalodiethylamine hydrohalides used as starting materials for the present invention can be prepared by known procedures. The β,β'-dibromodiethylamine hydrobromide compound can be prepared by reacting together a hydroxyalkyl amine such as dihydroxydiethyl amine and gaseous hydrohalide such as hydrogen bromide at a temperature of over 100° C. The β,β'-dichloro- and β,β'-diiododiethylamine hydrohalides are prepared in similar procedures employing hydrogen chloride or hydrogen iodide.

I claim:
1. A compound corresponding to the formula:

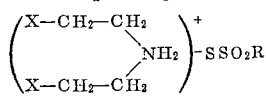

wherein X represents a halogen selected from the group consisting of chlorine, bromine and iodine, and R represents a member of a group consisting of lower alkyl, phenyl, lower alkylphenyl, halophenyl and lower alkylhalophenyl, in which halo represents a member of the group consisting of chlorine, bromine and iodine.

2. β,β' - dichlorodiethylammonium methanethiosulfonate.

3. β,β'-dichlorodiethylammonium p - toluenethiosulfonate.

4. β,β' - dichlorodiethylammonium benzenethiosulfonate.

References Cited by the Examiner
UNITED STATES PATENTS

| | | | |
|---|---|---|---|
| 3,082,231 | 3/1963 | Dunbar | 167—22 |
| 3,095,434 | 6/1963 | Stamm | 167—22 |
| 3,145,226 | 8/1964 | Rätz | 167—22 |

OTHER REFERENCES

Rutenburg et al.: J. Pharmacol. Exptl. Theap 111 (1954), 1838. Chem. Abstract article relied: C. A. vol. 48, 1954, columns 13959 and –60.

LORRAINE A. WEINBERGER, *Primary Examiner.*

M. WEBSTER, *Assistant Examiner.*